United States Patent
Shi et al.

(10) Patent No.: US 12,254,637 B2
(45) Date of Patent: Mar. 18, 2025

(54) SILHOUETTE IMAGE PROCESSING

(71) Applicant: Shanghai Bilibili Technology Co., Ltd., Shanghai (CN)

(72) Inventors: Bodi Shi, Shanghai (CN); Yong Luo, Shanghai (CN); Zhihao Huang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 363 days.

(21) Appl. No.: 17/859,688

(22) Filed: Jul. 7, 2022

(65) Prior Publication Data

US 2022/0343507 A1    Oct. 27, 2022

Related U.S. Application Data

(63) Continuation of application No. PCT/CN2020/140725, filed on Dec. 29, 2020.

(30) Foreign Application Priority Data

Mar. 13, 2020   (CN) .......................... 202010174662.6

(51) Int. Cl.
*G06T 7/12*   (2017.01)
*G06T 3/40*   (2024.01)
(Continued)

(52) U.S. Cl.
CPC ................. *G06T 7/12* (2017.01); *G06T 3/40* (2013.01); *G06T 7/11* (2017.01); *G06T 7/60* (2013.01);
(Continued)

(58) Field of Classification Search
CPC . G06T 7/194; G06T 2207/20084; G06T 5/50; G06T 7/11; G06T 2207/20221;
(Continued)

(56) References Cited

U.S. PATENT DOCUMENTS

2007/0237421 A1* 10/2007 Luo .......................... G06T 11/60
                                                                382/284
2011/0050723 A1*  3/2011 Tokunaga ............... G06T 11/00
                                                                345/627
(Continued)

FOREIGN PATENT DOCUMENTS

CN        103873741 A        6/2014
CN        109447981 A        3/2019
(Continued)

OTHER PUBLICATIONS

English Translation—CN-109493350-A (Year: 2019).*
(Continued)

*Primary Examiner* — Gandhi Thirugnanam
*Assistant Examiner* — Aaron Joseph Sorrin
(74) *Attorney, Agent, or Firm* — McAndrews, Held & Malloy, Ltd.

(57) ABSTRACT

A method of image processing includes: obtaining an original image and obtaining a to-be-processed image based on the original image; recognizing the to-be-processed image by using an image recognition model to obtain a silhouette array; generating a silhouette image based on the silhouette array; and generating a target image based on the original image and the silhouette image, where the target image corresponds to a region of interest of the original image.

17 Claims, 13 Drawing Sheets

(51) Int. Cl.
G06T 7/11 (2017.01)
G06T 7/60 (2017.01)

(52) U.S. Cl.
CPC ............... *G06T 2207/20081* (2013.01); *G06T 2207/20084* (2013.01); *G06T 2207/30196* (2013.01)

(58) Field of Classification Search
CPC . G06T 11/00; G06T 2207/10024; G06T 5/00; G06T 7/13; G06T 7/564; G06T 7/12; G06T 3/40; G06T 7/60; G06T 2207/20081; G06T 2207/30196; G06T 2207/10004; G06T 11/60; G06F 18/22; G06F 16/7837; G06V 10/25; G06V 10/40; G06V 10/764; G06V 10/44; G06V 10/22; G06V 10/26; G06V 10/46; G06V 10/752; G06V 10/761
See application file for complete search history.

(56) References Cited

U.S. PATENT DOCUMENTS

| | | | | |
|---|---|---|---|---|
| 2015/0334398 | A1* | 11/2015 | Socek | H04N 19/182 375/240.26 |
| 2018/0336685 | A1* | 11/2018 | Miyauchi | G06T 7/194 |
| 2020/0250830 | A1* | 8/2020 | Chae | G06T 7/155 |

FOREIGN PATENT DOCUMENTS

| | | | | |
|---|---|---|---|---|
| CN | 109493350 | A * | 3/2019 | ........... G06N 3/0454 |
| CN | 110148192 | A | 8/2019 | |
| CN | 110163866 | A | 8/2019 | |
| CN | 110189354 | A | 8/2019 | |
| CN | 110222694 | A | 9/2019 | |
| CN | 110717919 | A | 1/2020 | |
| WO | 2016207875 | A1 | 12/2016 | |

OTHER PUBLICATIONS

International Search Report with a mailing date of Feb. 25, 2021, in International application No. PCT/CN2020/140725, filed on Dec. 29, 2020.
BodyPix-Person Segmentation in the Browser, https://web.archive.org/web/20191121165307/https://github.com/tensorflow/tfjs-models/tree/master/body-pix, downloaded on May 5, 2023 (16 pages).
Ruigang Fu, et al, Fully automatic figure-ground segmentation algorithm based on deep convolutional neural network and GrabCut, The Institute of Engineering and Technology, Aug. 2, 2016 (6 pages).

* cited by examiner

SILHOUETTE IMAGE PROCESSING

CROSS-REFERENCE TO RELATED APPLICATION

The present application is continuation under 35 U.S.C. 111(a) of PCT International Application No. PCT/CN2020/140725, filed on Dec. 29, 2020, which claims priority to Chinese Patent Application No. 202010174662.6, filed on Mar. 13, 2020, which is incorporated herein by reference in its entirety.

TECHNICAL FIELD

Embodiments of the present application relate to the field of computer technologies, and in particular, to a method of image processing, a device, and a computer-readable storage medium.

BACKGROUND

In recent years, electronic devices may provide users with various functions and services. These electronic devices may be, for example, computers, tablet computers, televisions, multimedia devices, or mobile devices. In some cases, these electronic devices may perform a silhouette operation by using an application installed thereon. The silhouette operation refers to separating some image regions (for example, a human body contour) from a photo/video, and placing these separated image regions into another photo/video.

It should be noted that the foregoing content is not intended to limit the protection scope of the present application.

SUMMARY

An aspect of the embodiments of the present application provides a method including: obtaining an original image and obtaining a to-be-processed image based on the original image; recognizing the to-be-processed image by using an image recognition model to obtain a silhouette array, where the silhouette array includes a plurality of silhouette array elements, and the plurality of silhouette array elements include a plurality of first values corresponding to a region of interest of the to-be-processed image and a plurality of second values corresponding to a region of non-interest of the to-be-processed image; generating a silhouette image based on the silhouette array; and generating a target image based on the original image and the silhouette image, where the target image corresponds to a region of interest of the original image.

In some embodiments, the obtaining an original image and obtaining a to-be-processed image based on the original image includes: determining whether a size of the original image is equal to a predetermined size; determining the original image as the to-be-processed image if the size of the original image is equal to the predetermined size; and adjusting the original image to be the to-be-processed image if the size of the original image is not equal to the predetermined size, where a size of the to-be-processed image is equal to the predetermined size.

In some embodiments, the image recognition model includes a trained neural network model; and the recognizing the to-be-processed image by using an image recognition model to obtain a silhouette array includes: inputting the to-be-processed image to the trained neural network model, and outputting the silhouette array by using the neural network model, where each first value in the silhouette array and each image pixel in the region of interest of the to-be-processed image are in a one-to-one correspondence, and each second value in the silhouette array and each image pixel in the region of non-interest of the to-be-processed image are in a one-to-one correspondence.

In some embodiments, generating a silhouette image based on the silhouette array includes: generating an initial silhouette image based on the silhouette array, where the initial silhouette image includes a plurality of first pixels and a plurality of second pixels, each first pixel in the initial silhouette image and each first value in the silhouette array are in a one-to-one correspondence, and each second pixel in the initial silhouette image and each second value in the silhouette array are in a one-to-one correspondence; and generating the silhouette image based on the initial silhouette image, where a size of the silhouette image is the same as that of the original image.

In some embodiments, generating a target image based on the original image and the silhouette image includes: determining to use the silhouette image as a mask image for a mask filter; and extracting the region of interest of the original image from the original image by using the mask filter, to obtain the target image.

In some embodiments, the method further includes: calculating a silhouette matching degree between the silhouette array and a reference array of a reference image; and inserting the target image into the reference image if the silhouette matching degree between the silhouette array and the reference array of the reference image is greater than a preset threshold.

In some embodiments, calculating a silhouette matching degree between the silhouette array and a reference array of a reference image includes: calculating the silhouette matching degree based on each reference array element in the reference array and a corresponding silhouette array element in the silhouette array.

An aspect of the embodiments of the present application further provides a computer device, including one or more processors; and a memory storing one or more programs configured to be executed by the one or more processors, the one or more programs comprising instructions for: obtaining an original image and obtaining a to-be-processed image based on the original image; recognizing the to-be-processed image by using an image recognition model to obtain a silhouette array, where the silhouette array includes a plurality of silhouette array elements, and the plurality of silhouette array elements include a plurality of first values corresponding to a region of interest of the to-be-processed image and a plurality of second values corresponding to a region of non-interest of the to-be-processed image; generating a silhouette image based on the silhouette array; and generating a target image based on the original image and the silhouette image, where the target image corresponds to a region of interest of the original image.

An aspect of the embodiments of the present application further provides a computer-readable storage medium, including a memory, a processor, and computer-readable instructions stored on the memory and executable on the processor, where when executing the computer-readable instructions, the processor implements the following steps: obtaining an original image and obtaining a to-be-processed image based on the original image; recognizing the to-be-processed image by using an image recognition model to obtain a silhouette array, where the silhouette array includes a plurality of silhouette array elements, and the plurality of silhouette array elements include a plurality of first values corresponding to a region of interest of the to-be-processed image and a plurality of second values corresponding to a region of non-interest of the to-be-processed image; generating a silhouette image based on the silhouette array; and generating a target image based on the original image and the silhouette image, where the target image corresponds to a region of interest of the original image.

DETAILED DESCRIPTION OF EMBODIMENTS

Figure 1:
FIG. 1 is a diagram schematically showing an application environment of a method of image processing according to some embodiments of the present application.

To make the embodiments and advantages of the present application clearer and more comprehensible, the following further describes the present application in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Thus, features defined with "first" and "second" may explicitly or implicitly include at least one of the features. In addition, technical solutions of various embodiments can be combined with each other, but they must be based on the realization by those of ordinary skill in the art. When a combination of technical solutions is contradictory or cannot be realized, it should be considered that such a combination of the technical solutions neither exists, nor falls within the scope of protection of the present application claimed.

The inventor of the present application finds that silhouette applications in the related art have requirements for operating systems, hardware configurations, and the like of electronic devices. For example, the portrait silhouette feature from Apple Inc. is applicable only for iOS 11 or later, and requires a depth-of-field camera.

Apple Inc. provides an ARKit platform, which has functions of collecting depth-of-field information and human body information. The ARKit platform can identify a depth of a human body in a physical environment, and recognize and split a portrait from an image based on depth-of-field information and portrait information. However, the inventor of the present application finds that the ARKit platform also has limitations as follows. 1. The ARKit platform is a closed source framework provided by Apple Inc., which is not applicable to other operating systems such as Android. 2. The ARKit platform is applicable only for iOS 11 or later, and is not applicable for system versions earlier than iOS 11. 3. Camera devices (such as mobile phones) are required to have hardware functions of identifying human bodies and depths of field. For example, at least an iPhone X series model with a depth-of-field camera is required. 4. Hardware with a high level of configuration is required to perform a large number of graphics operations, which may consume huge power. The following embodiments are intended to resolve the problems that existing silhouette operations require hardware with a high level of configuration, consume huge power due to execution of a large number of graphics operations, and are limited by system platforms.

FIG. 1 is a diagram schematically showing environment application of a method of image processing according to some embodiments of the present application. In some exemplary embodiments, a computer device 2 may be configured to provide a silhouette service. The computer device 2 may include any type of computing device, such as a mobile device, a tablet device, a laptop computer, a computing station, a virtual reality device, a set-top box, a smart television, or a television box, or may be a server having a silhouette function, or the like.

As shown in FIG. 1, the computer device 2 displays an image showing a girl standing in a particular posture. The present application is intended to separate a human body contour region of the girl from the image for a silhouette operation. According to some embodiments, the silhouette operation refers to separating the human body contour region of the girl from the image, and placing the separated human body contour region into another image or video. The method of image processing of the present application is described below by using the image as an example. However, it should be noted that the method of image processing of the present application is not only adapted to separating a human body contour region from an image, but also adapted to separating a contour of another object from the image. The contour of the another object may be a contour of a cat, a dog, a bear, or another living thing.

Figure 2:
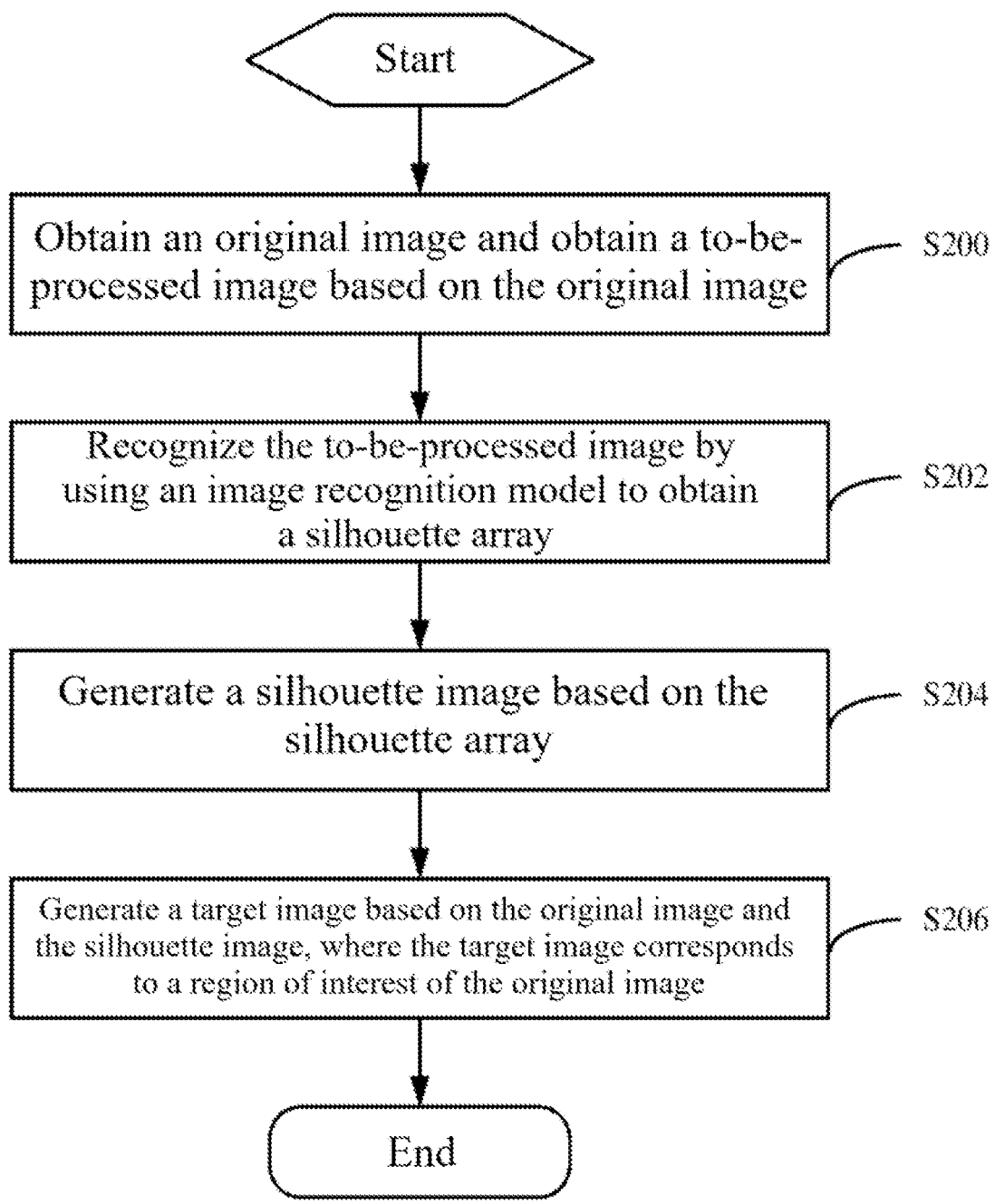
FIG. 2 is flowchart schematically showing a method of image processing according to some embodiments of the present application.

FIG. 2 is flowchart schematically showing a method of image processing according to some embodiments of the present application. It may be understood that the flowchart in this method embodiment is not intended to limit an execution sequence of the steps. Exemplary description is made below by using the computer device 2 as the executor.

As shown in FIG. 2, the method of image processing may include steps S200 to S206.

In step S200, an original image is obtained and a to-be-processed image is obtained based on the original image.

A source and a type of the original image are not limited in the embodiments of the present application. For example, the original image may be collected by the computer device 2 in real time by using a built-in camera element, or may be obtained from a database or another data source. The original image includes a region of interest and a region of non-interest. The region of interest may be a picture or video region, such as a human body contour region or an animal contour region to be extracted. The region of non-interest is a region, other than the region of interest, in the original image. As shown in FIG. 1, the computer device 2 displays an image showing a girl standing in a particular posture. In order to facilitate the description of the present application, in this embodiment of the present application, the image shown in FIG. 1 is used as the original image, the human body contour region of the girl is used as the region of interest of the original image, and the remaining region other than the human body contour region of the girl is used as the region of non-interest.

Figure 3:
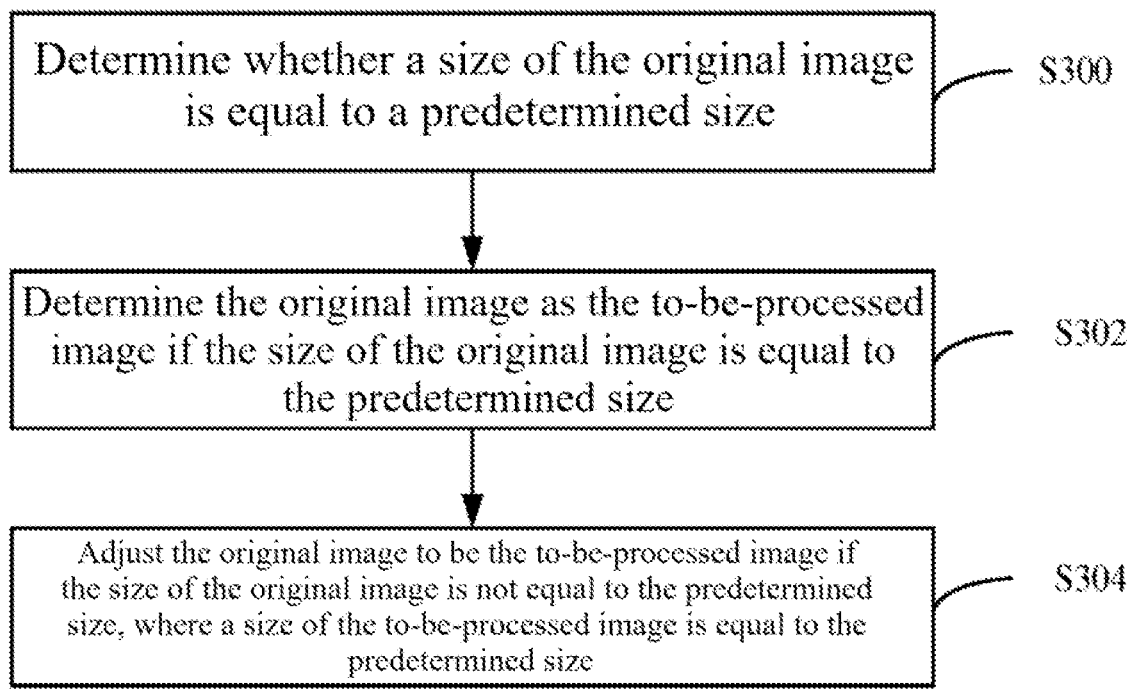
FIG. 3 schematically shows substeps of step S200 in FIG. 2.

Image processing usually imposes specific requirements on an image size, format, and the like. Therefore, in order to improve operability and processing efficiency of subsequent steps of the method of image processing, some preprocessing may be performed on the original image in this embodiment of the present application, for example, the size of the original image is normalized. In some exemplary embodiments, as shown in FIG. 3, step S200 may include steps S300 to S304. In step S300, whether a size of the original image is equal to a predetermined size is determined. In step S302, the original image is determined as the to-be-processed image if the size of the original image is equal to the predetermined size. In step S304, the original image is adjusted to be the to-be-processed image if the size of the original image is not equal to the predetermined size, where a size of the to-be-processed image is equal to the predetermined size.

For example, if the method of image processing requires involvement of a neural network model subsequently, the predetermined size is determined based on parameter specifications of the neural network model. For example, the predetermined size is set to be "513 (pixels)*513 (pixels)", and the predetermined size is 513 pixels long and wide.

In step S202, the to-be-processed image is recognized by using an image recognition model to obtain a silhouette array.

The silhouette array includes a plurality of silhouette array elements. The plurality of silhouette array elements include a plurality of first values and a plurality of second values. The plurality of first values correspond to a region of interest of the to-be-processed image, and the plurality of second values correspond to a region of non-interest of the to-be-processed image.

In some exemplary embodiments, each first value may be represented by a non-zero value (for example, "1"), and each second value may be represented by "0". It is not difficult to understand that an image pixel, corresponding to each silhouette array element "1" in the silhouette array, in the to-be-processed image is within the region of interest of the to-be-processed image. On the contrary, an image pixel, corresponding to each silhouette array element "0" in the silhouette array, in the to-be-processed image is outside the region of interest (a human body contour region) of the to-be-processed image.

There are various methods of recognizing the to-be-processed image. For example, the computer device 2 may improve the grayscale of the to-be-processed image or the contrast of a RGB channel, recognize an edge, divide the to-be-processed image into various regions along the edge, and then try to combine several adjacent regions for comparison with items in a database or for analysis by a deep learning module, so as to achieve a recognition goal. Deep learning is a type of machine learning. It finds out the inherent rules and representation levels from provided sample data. A model is trained. The trained model can interpret things, such as languages, images, and the like that usually can only be understood by human sense organs into several levels, and several pieces of feature information are included at each level.

Figure 4:
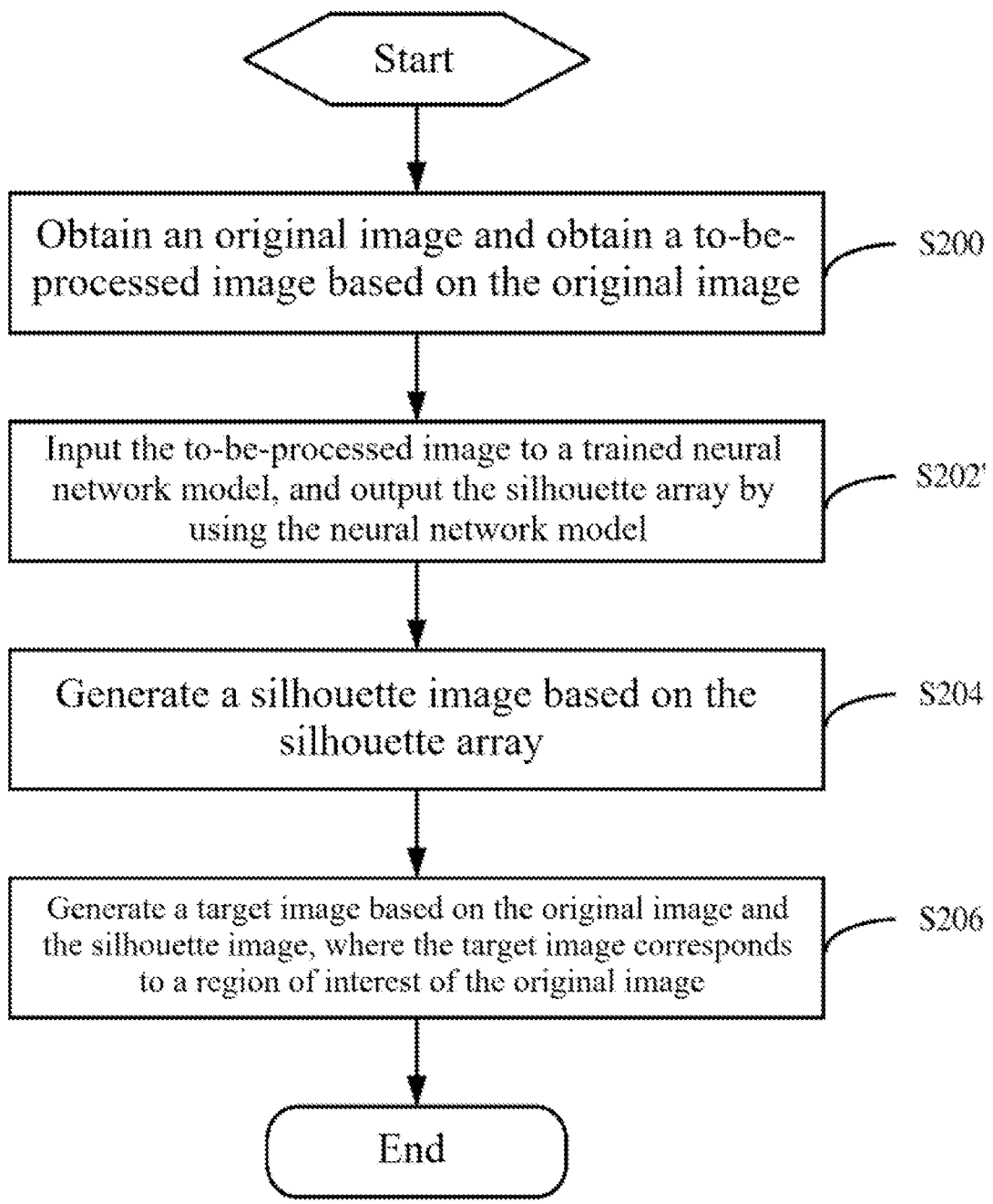
FIG. 4 is another flowchart schematically showing the method of image processing according to some embodiments of the present application.

In this embodiment of the present application, the computer device 2 may obtain a region of interest (for example, a human body contour region) in the to-be-processed image by relying on a machine learning framework. The machine learning method imposes no mandatory requirement on hardware in terms of obtaining the region of interest, and is also applicable to operating systems such as Android, and thus may be applied to most of existing smart terminal devices. According to some embodiments, the region of interest can be recognized without using depth-of-field information or requiring a large number of image operations or high energy consumption. In some exemplary embodiments, the image recognition model includes a trained neural network model. As shown in FIG. 4, step S202 may include step S202': inputting the to-be-processed image to the trained neural network model, and outputting the silhouette array by using the neural network model, where each first value in the silhouette array and each image pixel in the region of interest of the to-be-processed image are in a one-to-one correspondence, and each second value in the silhouette array and each image pixel in the region of non-interest of the to-be-processed image are in a one-to-one correspondence. For example, if the size of the to-be-processed image is 513*513, the silhouette array corresponds to a two-dimensional array of 513*513. For example, a silhouette array element corresponding to the third row and fifth column of the silhouette array is the second value "0", that is $V_{[3][5]}=0$, where $V_{[3][5]}$ corresponds to a pixel $R_{[3][5]}$ corresponding to the third row and fifth column of the to-be-processed image. Since $V_{[3][5]}=0$, the pixel $R_{[3][5]}$ in the to-be-processed image is outside the region of interest (a human body contour region) of the to-be-processed image.

The neural network model may be a deep neural network model, for example, a tensorflow-deeplab-v3 model.

In step S204, a silhouette image is generated based on the silhouette array.

The silhouette image may be a black-and-white image composed of a plurality of black pixels and a plurality of white pixels, or may be a two-color image composed of pixels in other colors, such as a red-and-black image composed of a plurality of black pixels and a plurality of red pixels.

Figure 5:
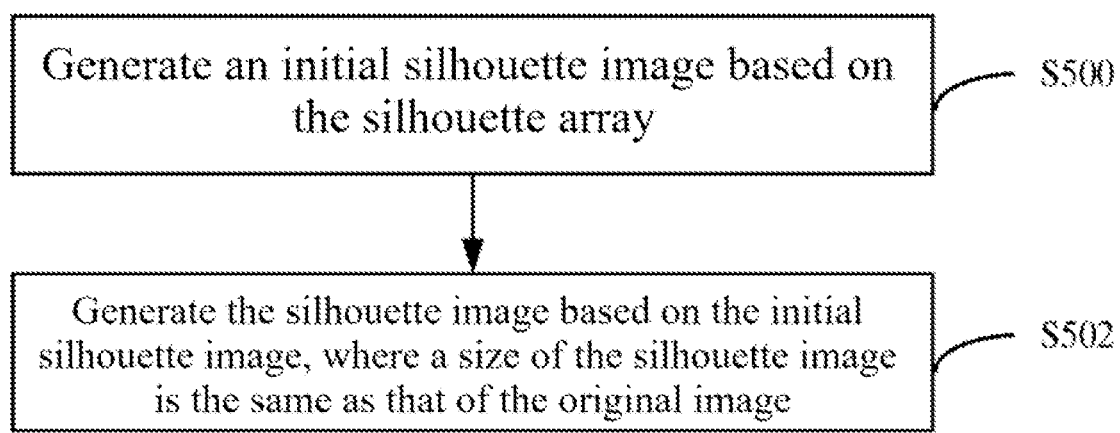
FIG. 5 schematically shows substeps of step S204 in FIG. 2.

In some exemplary embodiments, as shown in FIG. 5, step S204 may include steps S500 to S502. In step S500, an initial silhouette image is generated based on the silhouette array. In step S502, the silhouette image is generated based on the initial silhouette image, where a size of the silhouette image is the same as that of the original image. The initial silhouette image includes a plurality of first pixels and a plurality of second pixels, each first pixel in the initial silhouette image and each first value in the silhouette array are in a one-to-one correspondence, and each second pixel in the initial silhouette image and each second value in the silhouette array are in a one-to-one correspondence.

The numbers of columns and rows of the silhouette array are respectively equal to the numbers of width pixels and height pixels of the to-be-processed image. Since the size of the to-be-processed image may be different from the size of the original image, the computer device 2 may first generate, based on the silhouette array, the initial silhouette image corresponding to the silhouette array, where the numbers of columns and rows of the silhouette array are respectively equal to the numbers of width pixels and height pixels of the initial silhouette image; and then, a silhouette image having a same size as the original image is generated based on the initial silhouette image, that is, the silhouette image is an image that is composed of a plurality of first pixels and a plurality of second pixels and that has the same number of pixels as the original image.

Figure 6:
FIG. 6 shows a silhouette image in FIG. 1.

In some exemplary embodiments, the first pixels are white pixels and the second pixels are black pixels. Each first value "1" in the silhouette array and each white pixel in the initial silhouette image are in a one-to-one correspondence, and each second value "0" in the silhouette array and each black pixel in the initial silhouette image are in a one-to-one correspondence. Similarly, the silhouette image generated based on the initial silhouette image is an image also composed of a plurality of white pixels and a plurality of black pixels, as shown in FIG. 6.

In step S206, a target image is generated based on the original image and the silhouette image, where the target image corresponds to a region of interest of the original image.

Figure 7:
FIG. 7 shows a target image in FIG. 1.

For example, the computer device 2 may separate the region of interest (a human body contour region) in the original image from the original image based on the silhouette image, so as to obtain the target image shown in FIG. 7.

Figure 8:
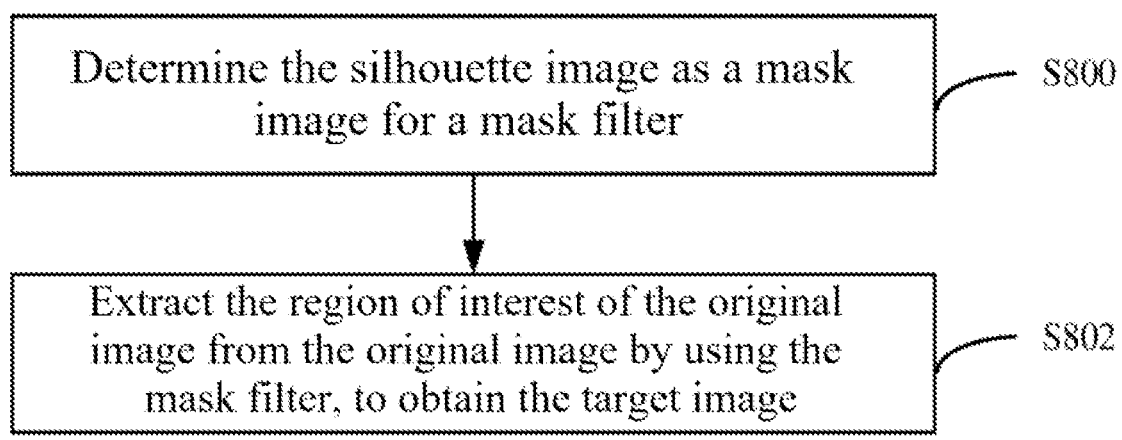
FIG. 8 schematically shows substeps of step S206 in FIG. 2.

For example, as shown in FIG. 8, step S206 may include steps S800 to S802. In step S800, it is determined that the silhouette image is used as a mask image for a mask filter. In step S802, the region of interest of the original image is extracted from the original image by using the mask filter, to obtain the target image. The mask filter is used to extract, by shielding a region of non-interest of the original image, the region of interest of the original image from the original image, to obtain an image of the region of interest (for example, the target image).

According to the foregoing method of image processing provided in this embodiment of the present application, the region of interest is recognized and split from the original image based on the silhouette array and the silhouette image. According to some embodiments, the region of interest and the region of non-interest of the to-be-processed image are recognized by using an image recognition model, and are represented by the silhouette array in an array form and distinguished from each other; then, a corresponding silhouette image is generated based on the silhouette array; and the region of interest of the original image is split from the region of non-interest of the original image based on the silhouette image, to obtain the target image. In the foregoing steps, the region of interest (for example, the human body contour region) is recognized and split from the original image without using depth-of-field information. Therefore, neither hardware with a high level of configuration nor a large number of graphics operations are required, and an advantage of low energy consumption is thus achieved.

According to some embodiments, an image form is replaced with the array form, which further reduces a data processing amount of image processing.

The target image obtained from the original image may be used in multiple scenes, such as an animation scene. For example, after obtaining the target image (namely, the human body contour region of the original image), the computer device 2 may place the target image into another image or video, for example, place the target image in a comic image, that is, incorporating a real-person image into the comic image to realize fusion of the real-person image and a virtual scene.

It may be understood that it is not easy to place the target image into another image or video, and the first issue to consider is: whether the target image highly matches a region to be replaced in another image or video. For example, the computer device 2 may determine whether the human body contour shown in FIG. 7 matches a human body contour (such as a cartoon human body contour in a comic image) to be replaced in another image or video.

For convenience of description, an insertion/placement object of the target image is collectively referred to as a reference image below.

Figure 9:
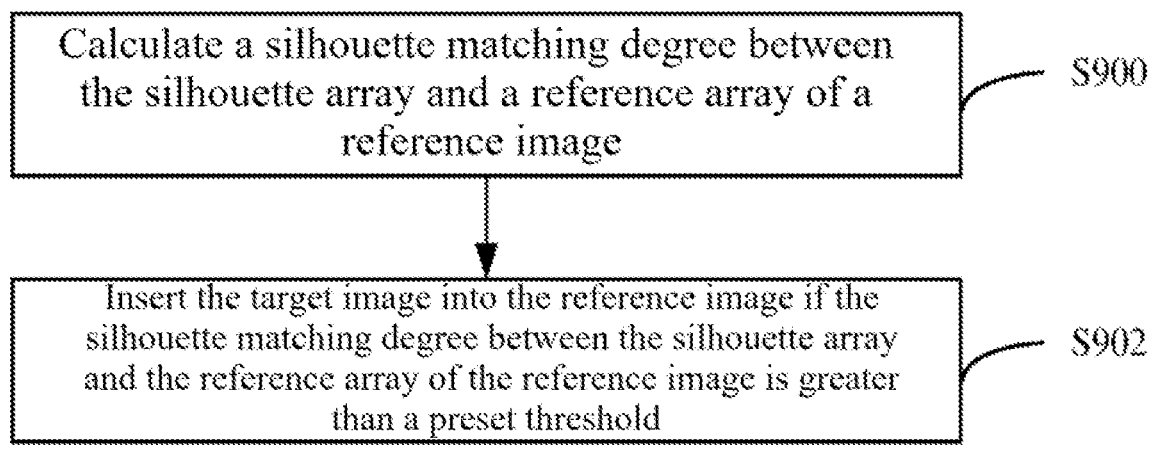
FIG. 9 is an additional flowchart schematically showing the method of image processing according to some embodiments of the present application.

In some exemplary embodiments, as shown in FIG. 9, the computer device 2 may accurately determine, through steps S900 to S902, a matching degree between the target image and the reference image. In step S900, a silhouette matching degree between the silhouette array and a reference array of a reference image is calculated. In step S902, the target image is inserted into the reference image if the silhouette matching degree between the silhouette array and the reference array of the reference image is greater than a preset threshold. Certainly, if the silhouette matching degree between the silhouette array and the reference array of the reference image is not greater than the preset threshold, it indicates that it is not suitable to insert the target image into the reference image.

Figure 10:
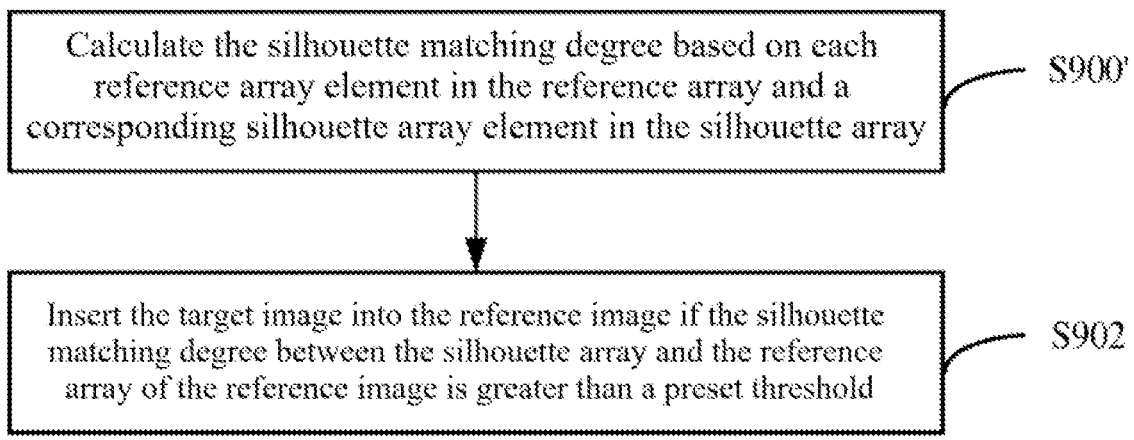
FIG. 10 schematically shows substeps of step S900 in FIG. 9.

In some exemplary embodiments, as shown in FIG. 10, step S900 may include step S900': calculating the silhouette matching degree based on each reference array element in the reference array and a corresponding silhouette array element in the silhouette array.

For example, the silhouette array may be a two-dimensional array "shadow" composed of a plurality of zero values and a plurality of non-zero values, and the reference array may be another two-dimensional array "refer" composed of a plurality of zero values and a plurality of non-zero values. The number of rows of the silhouette array is the same as the number of rows of the reference array, and the number of columns of the silhouette array is the same as the number of columns of the reference array. The computer device 2 may determine, one by one, the number of silhouette array elements "numerator" obtained when each silhouette array element in the silhouette array and a reference array element at a corresponding location in the reference array are both greater than zero, which is specifically as follows: If(shadow[i][j]>0 && refer[i][j]>0)numerator++; the computer device may determine, one by one, the number of silhouette array elements "denumerator" obtained when each silhouette array element in the silhouette array is greater than zero or a reference array element at a corresponding location in the reference array is greater than zero, which is specifically as follows: If(shadow[i][j]>0||refer[i][j]>0)denumerator++; and the computer device may determine a quotient obtained by dividing numerator by denumerator as the silhouette matching degree.

Figure 11:
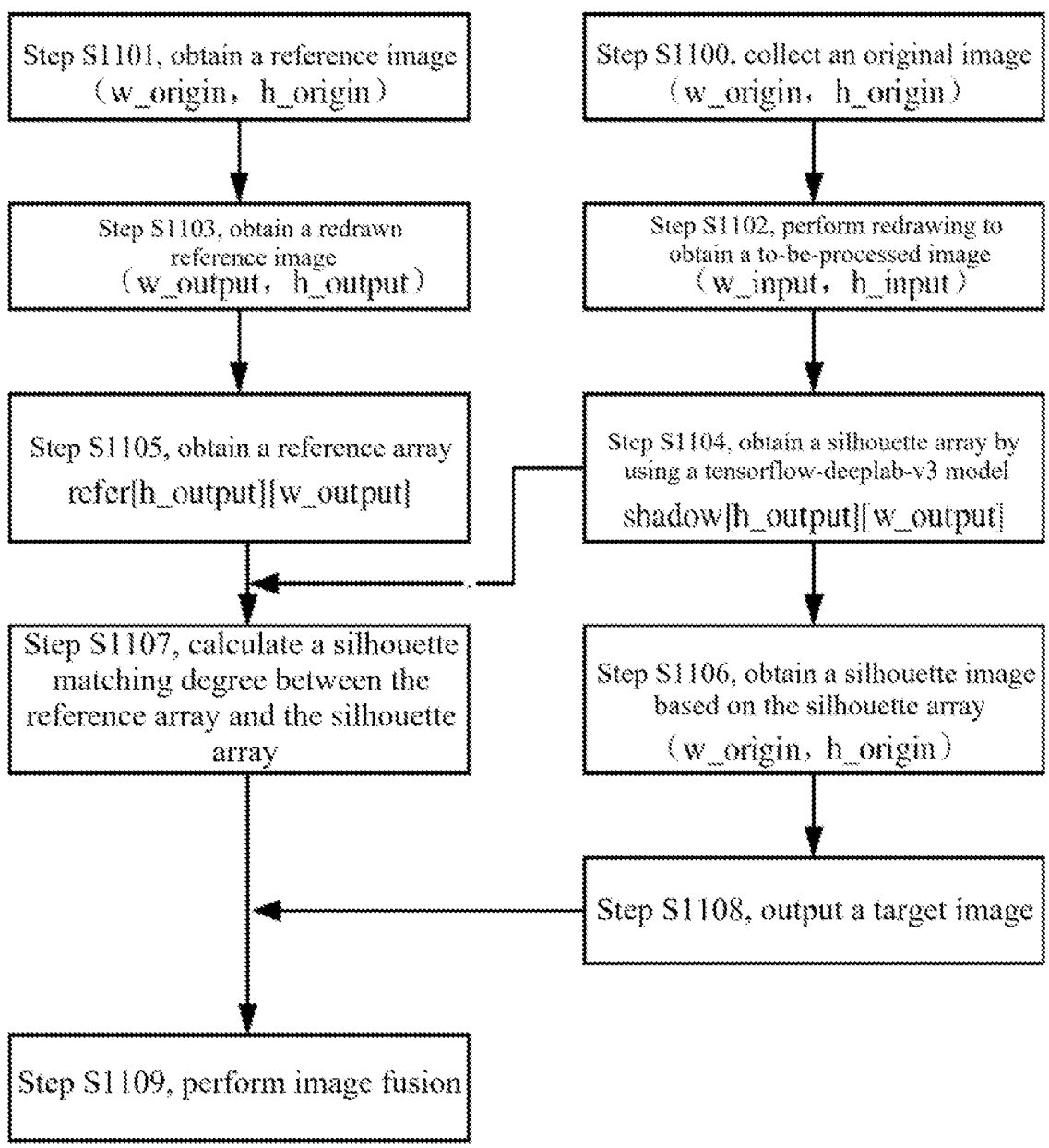
FIG. 11 schematically shows an animation silhouette process according to some embodiments of the present application.

As shown in FIG. 11, an animation silhouette process of the method of image processing according to the some embodiments is specifically described below. The specific steps are as follows.

In step S1100, the computer device 2 collects an original image input_image by using a camera, where a width and a height of the original image input_image are respectively w_origin and h_origin.

In step S1102, the computer device 2 redraws the original image input_image to obtain a to-be-processed image (w_input*h_input pixels). The width and height of the to-be-processed image are respectively w_input and h_input, and both w_input and h_input are 513 pixels.

In step S1104, the computer device 2 inputs the to-be-processed image to a trained tensorflow-deeplab-v3 model, and outputs a silhouette array shadow by using the trained tensorflow-deeplab-v3 model. The silhouette array is a two-dimensional array shadow[h_output][w_output], and the silhouette array is of w_output columns and h_output rows. Each silhouette array element in the silhouette array is an integer. For example, "0" indicates that a pixel, corresponding to the silhouette array element, in the to-be-processed image is outside the region of interest (for example, the human body contour region shown in FIG. 1) of the to-be-processed image, and "1" indicates that a pixel, corresponding to the silhouette array element, in the to-be-processed image is within the region of interest (for example, the human body contour region shown in FIG. 1) of the to-be-processed image.

Figure 12:
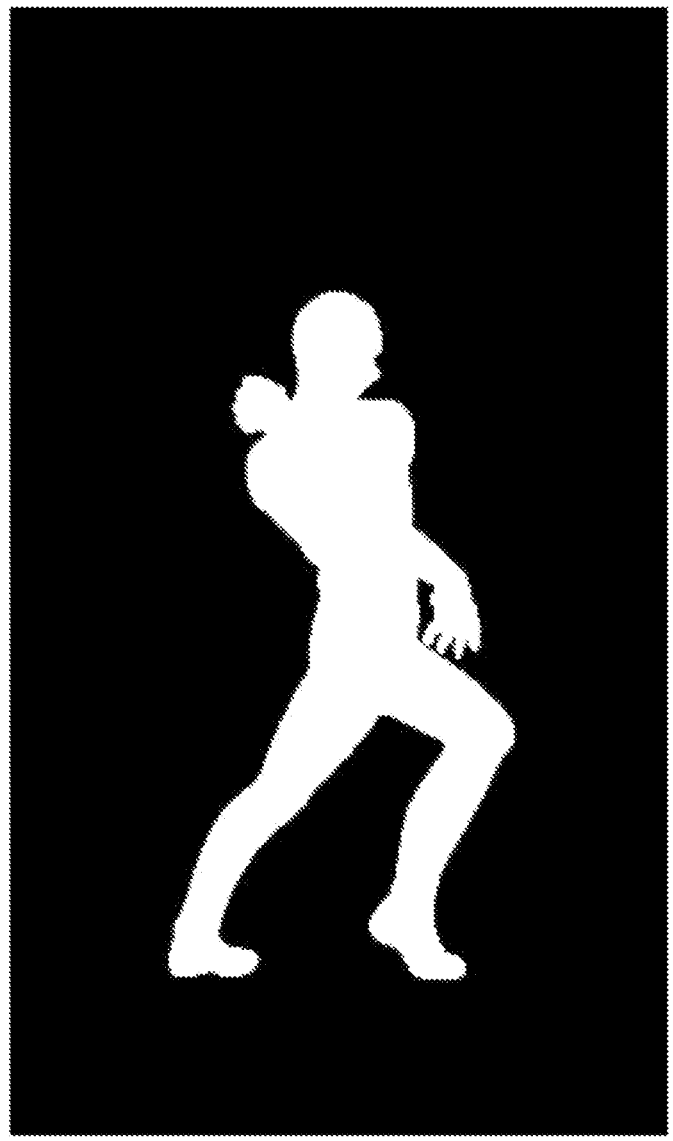
FIG. 12 shows a silhouette image (mask_image) in some embodiments of the present application.

In step S1106, the computer device 2 generates an initial silhouette image (w_output*h_output pixels) based on the silhouette array shadow[h_output][w_output], where the initial silhouette image (w_output*h_output pixels) is an image composed of a plurality of black and white pixels, each black pixel corresponds to a silhouette array element "0" at a corresponding location in the silhouette array shadow[h_output][w_output], and each white pixel corresponds to a silhouette array element "1" at a corresponding location in the silhouette array shadow[h_output][w_output]. Then, the computer device performs context redrawing on the initial silhouette image (w_output*h_output pixels) to generate a silhouette image mask_image (w_origin*h_origin pixels), where a size (w_origin*h_origin pixels) of the silhouette image mask_image is the same as a size (w_origin*h_origin pixels) of the original image input_image, as shown in FIG. 12.

In step S1108, the computer device 2 constructs a mask filter, where input parameters are the original image input_image, an arbitrarily selected background image background_image (which may be blank), and the silhouette image mask_image, which are of the same size. The mask filter may perform a pixel color value operation for each pixel in the original image input_image and a pixel at the same location in the silhouette image mask_image (for a specific location, if a pixel color value input of the pixel at this location in the original image input_image is not 0, an intersection operation is performed on the pixel color value input of the pixel at this location in the original image input_image and a pixel color value mask of the pixel at this location in the silhouette image mask_image). If a result of the intersection operation is not 0, input & mask is used; or if a result of the intersection operation is 0, whether there is a pixel color value background at this location in the background image background_image is determined; and if yes, background is used; or if not, 0 is used, and finally, the target image output image is output. According to some embodiments, this may be implemented by using the following code:

```
int result[h_origin][w_origin]={0};
for(int i=0;i<h_origin;i++)
{
    for(int j=0;j<w_origin;j++)
    {
        result[i][j]=input[i][j]?
        (input[i][j]&mask[i][j]?:
        (background[i][j]?:0)):0;
    }
}
return result;
```

In step S1101, the computer device 2 obtains a reference image (w_origin*h_origin pixels). A width and a height of the reference image are respectively w_origin and h_origin.

In step S1103, the computer device 2 performs context redrawing on the reference image w_origin*h_origin pixels) to obtain a redrawn reference image (w_output*h_output pixels).

In step S1105, the computer device 2 converts the redrawn reference image (w_output*h_output pixels) into a reference array refer. The reference array is a two-dimensional array refer[h_output][w_output], and the reference array is of w_output columns and h_output rows.

In step S1107, the computer device 2 calculates a silhouette matching degree between the reference array refer and the silhouette array shadow. According to some embodiments, the computer device 2 may perform calculation on each silhouette array element shadow[i][j] in the silhouette array and a reference array element refer[i][j] at a corresponding location in the reference array (to output a quotient obtained by dividing the number of locations numerator where an intersection result is greater than 0 by the number of locations denumerator where a union result is greater than 0). According to some embodiments, this may be implemented by using the following code:

```
inf numerator=0;
int denumerator=0;
for int i=0;i<h_output;i++)
{
    for(int j=0;j<w_output;j++)
    {
        if ( shadow[i][j]>0 && refer[i][j]>0 ) numerator++;
        if ( shadow[i][j]>0 || refer[i][j]>0 ) denumerator++;
    }
}
return(float) numerator/denumerator;
```

Figure 13:
FIG. 13 shows a fused image in some embodiments of the present application.

In step S1109, the computer device 2 may perform image fusion if the silhouette matching degree is greater than a preset threshold. For example, the computer device 2 may insert the target image output_image into the reference image, or insert part of the image in the reference image into the original image input_image to replace the target image. For example, the computer device inserts a real-person image in the parameter image into the original image input_image to obtain a fused image shown in FIG. 13. For example, the computer device 2 may also give a score based on similarity between the target image and the real-person image, and display the score in the fused image to make it more interesting.

Figure 14:
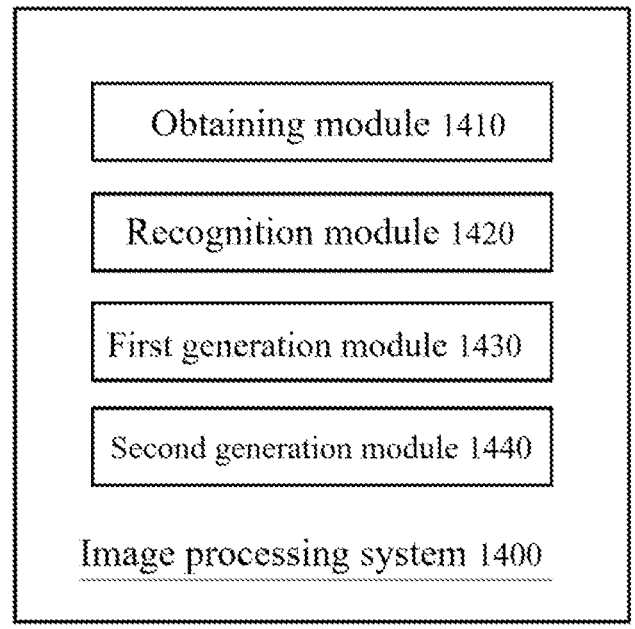
FIG. 14 is a block diagram schematically showing a system of image processing according to some embodiments of the present application.

FIG. 14 is a block diagram schematically showing a system of image processing according to some embodiments of the present application. The system of image processing may be divided into one or more program modules, and the one or more program modules are stored in a storage medium and executed by one or more processors to implement the embodiments of the present application. The program modules in this embodiment of the present application refer to a series of computer-readable instruction segments that can complete a specific function. The functions of the program modules in this embodiment are specifically described in the following description.

As shown in FIG. 14, the system of image processing 1400 may include an obtaining module 1410, a recognition module 1420, a first generation module 1430, and a second generation module 1440.

The obtaining module 1410 is configured to obtain an original image and obtain a to-be-processed image based on the original image;

the recognition module 1420 is configured to recognize the to-be-processed image by using a neural network model to obtain a silhouette array, where the silhouette array includes a plurality of silhouette array elements, and the silhouette array elements include a plurality of first values corresponding to a region of interest of the to-be-processed image and a plurality of second values corresponding to a region of non-interest of the to-be-processed image;

the first generation module 1430 is configured to generate a silhouette image based on the silhouette array; and the second generation module 1440 is configured to generate a target image based on the original image and the silhouette image, where the target image corresponds to a region of interest of the original image.

In some exemplary embodiments, the obtaining module 1410 is further configured to: determine whether a size of the original image is equal to a predetermined size; determine the original image as the to-be-processed image if the size of the original image is equal to the predetermined size; and adjust the original image to be the to-be-processed image if the size of the original image is not equal to the predetermined size, where a size of the to-be-processed image is equal to the predetermined size.

In some exemplary embodiments, the image recognition model includes a trained neural network model. The recognition module 1420 is further configured to: input the to-be-processed image to the trained neural network model, and output the silhouette array by using the neural network model, where each first value in the silhouette array and each image pixel in the region of interest of the to-be-processed image are in a one-to-one correspondence, and each second value in the silhouette array and each image pixel in the region of non-interest of the to-be-processed image are in a one-to-one correspondence.

In some exemplary embodiments, the first generation module 1430 is further configured to: generate an initial silhouette image based on the silhouette array, where the initial silhouette image includes a plurality of first pixels and a plurality of second pixels, each first pixel in the initial silhouette image and each first value in the silhouette array are in a one-to-one correspondence, and each second pixel in the initial silhouette image and each second value in the silhouette array are in a one-to-one correspondence; and generate the silhouette image based on the initial silhouette image, where a size of the silhouette image is the same as that of the original image.

In some exemplary embodiments, the second generation module 1440 is further configured to: determine to use the silhouette image as a mask image for a mask filter; and extract the region of interest of the original image from the original image by using the mask filter, to obtain the target image.

In some exemplary embodiments, the system of image processing 1400 further includes a calculation module (not identified) configured to: calculate a silhouette matching degree between the silhouette array and a reference array of a reference image; and insert the target image into the reference image if the silhouette matching degree between the silhouette array and the reference array of the reference image is greater than a preset threshold.

In some exemplary embodiments, the calculation module (not identified) is further configured to: calculate the silhouette matching degree based on each reference array element in the reference array and a corresponding silhouette array element in the silhouette array.

Figure 15:
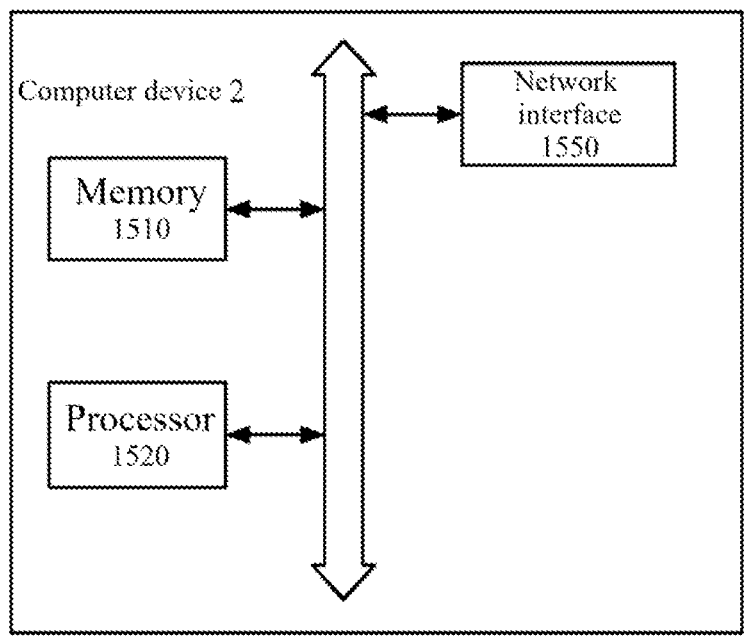
FIG. 15 is a schematic diagram schematically showing a hardware architecture of a computer device adapted to implement a method of image processing according to some embodiments of the present application.

FIG. 15 is a schematic diagram schematically showing a hardware architecture of a computer device 2 adapted to implement a method of image processing according to some embodiments of the present application. In this embodiment, the computer device 2 is a device that can automatically perform numerical calculation and/or information processing according to preset or pre-stored instructions. For example, the computer device may be a smartphone, a tablet computer, a notebook computer, a desktop computer, a rack server, a blade server, a tower server, a cabinet server (including a standalone server or a server cluster composed of a plurality of servers), or the like. As shown in FIG. 15, the computer device 2 at least includes, but is not limited to, a memory 1510, a processor 1520, and a network interface 1530, which may be communicatively linked to each other by using a system bus.

The memory 1510 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 1510 may be an internal storage module of the computer device 2, for example, a hard disk or memory of the computer device 2. In some other embodiments, the memory 1510 may alternatively be an external storage device of the computer device 2, for example, a plug-in type hard disk equipped on the computer device 2, a smart media card (SMC for short), a secure digital (SD for short) card, or a flash card. Certainly, the memory 1510 may alternatively include both the internal storage module of the computer device 2 and the external storage device of the computer device 2. In this embodiment, the memory 1510 is generally configured to store an operating system and various types of application software installed on the computer device 2, such as program code for the method of image processing. According to some embodiments, the memory 1510 may be further configured to temporarily store various types of data that have been output or are to be output.

The processor 1520 may be, in some embodiments, a central processing unit (CPU for short), a controller, a microcontroller, a microprocessor, or another data processing chip. The processor 1520 is generally configured to control overall operation of the computer device 2, for example, execute control, processing, and the like related to data exchange or communication with the computer device 2. In this embodiment, the processor 1520 is configured to run program code stored in the memory 1510 or to process data.

The network interface 1530 may include a wireless network interface or a wired network interface. The network interface 1530 is generally configured to establish a communication link between the computer device 2 and other computer devices. For example, the network interface 1530 is configured to connect the computer device 2 to an external terminal by using a network, and establish a data transmission channel, a communication link, and the like between the computer device 2 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 15 shows only a computer device having components 1510 to 1530, but it should be understood that not all of the illustrated components are required to be implemented, and more or fewer components may be implemented instead.

In this embodiment, the method of image processing stored in the memory 1510 may alternatively be divided into one or more program modules and executed by one or more processors (the processor 1520 in this embodiment) to implement the embodiments of the present application.

The present application further provides a computer-readable storage medium storing computer-readable instructions, where when the computer-readable instructions are executed by a processor, the following steps are implemented:

obtaining an original image and obtaining a to-be-processed image based on the original image;

recognizing the to-be-processed image by using an image recognition model to obtain a silhouette array, where the silhouette array includes a plurality of silhouette array elements, and the plurality of silhouette array elements include a plurality of first values corresponding to a region of interest of the to-be-processed image and a plurality of second values corresponding to a region of non-interest of the to-be-processed image;

generating a silhouette image based on the silhouette array; and generating a target image based on the original image and the silhouette image, where the target image corresponds to a region of interest of the original image.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various types of application software installed on the computer device, such as program code for the method of image processing in the embodiments. According to some embodiments, the computer-readable storage medium may be configured to temporarily store various types of data that have been output or are to be output.

According to the method of image processing, the device, and the computer-readable storage medium provided in some embodiments of the present application, a region of interest can be recognized and split from the original image based on a silhouette array and a silhouette image, and the region of interest (for example, a human body contour region) is recognized and split from the original image without using depth-of-field information. Therefore, hardware or a system with a high level of configuration is not required.

It is apparent to those skilled in the art that the various modules or steps in some embodiments of the present application may be implemented by a general-purpose computing apparatus, and may be centralized on a single computing apparatus or distributed on a network formed by a plurality of computing apparatuses. In some embodiments, the various modules or steps may be implemented by using program code executable by the computing apparatus, such that they may be stored in a storage apparatus and executed by the computing apparatus, and in some cases, the steps shown or described may be performed in a sequence different from that described herein, or they may be respectively fabricated into various integrated circuit modules, or a plurality of modules or steps thereof may be implemented as a single integrated circuit module. In this way, the embodiments of the present application are not limited to any specific combination of hardware and software.

The foregoing descriptions are merely some embodiments of the present application, and are not intended to limit the scope of the present application. Any transformation of equivalent structures or equivalent processes that is made using the contents of the description and accompanying drawings of the present application, or any direct or indirect application thereof in other related technical fields shall equally fall within the protection scope of the present application.

What is claimed is:

1. A method, comprising:

obtaining an original image and obtaining a to-be-processed image based on the original image;

recognizing the to-be-processed image through an image recognition model to obtain a silhouette array, wherein the silhouette array comprises a plurality of silhouette array elements, and the plurality of silhouette array elements comprise a plurality of first values corresponding to a region of interest of the to-be-processed image and a plurality of second values corresponding to a region of non-interest of the to-be-processed image;

generating a silhouette image based on the silhouette array;

generating a target image based on the original image and the silhouette image, wherein the target image corresponds to a region of interest of the original image;

calculating a silhouette matching degree between the silhouette array and a reference array of a reference image; and inserting the target image into the reference image if the silhouette matching degree between the silhouette array and the reference array of the reference image is greater than a preset threshold.

2. The method according to claim 1, wherein obtaining the original image and obtaining the to-be-processed image based on the original image comprises:
   determining the original image as the to-be-processed image if a size of the original image is equal to a predetermined size; and
   adjusting the original image to be the to-be-processed image if the size of the original image is not equal to the predetermined size, wherein a size of the to-be-processed image is equal to the predetermined size.

3. The method according to claim 1, wherein the image recognition model comprises a trained neural network model; recognizing the to-be-processed image through the image recognition model to obtain the silhouette array comprises:
   inputting the to-be-processed image into the trained neural network model, and outputting the silhouette array through the neural network model,
   wherein each first value of the silhouette array is in a one-to-one correspondence with each image pixel in the region of interest of the to-be-processed image, and each second value of the silhouette array is in a one-to-one correspondence with each image pixel in the region of non-interest of the to-be-processed image.

4. The method according to claim 1, wherein generating the silhouette image based on the silhouette array comprises:
   generating an initial silhouette image based on the silhouette array, wherein the initial silhouette image comprises a plurality of first pixels and a plurality of second pixels, each first pixel in the initial silhouette image is in a one-to-one correspondence with each first value of the silhouette array, and each second pixel in the initial silhouette image is in a one-to-one correspondence with each second value of the silhouette array; and
   generating the silhouette image based on the initial silhouette image, wherein a size of the silhouette image is the same as a size of the original image.

5. The method according to claim 4, wherein generating the target image based on the original image and the silhouette image comprises:
   determining the silhouette image as a mask image for a mask filter; and
   extracting the region of interest of the original image from the original image through the mask filter to obtain the target image.

6. The method according to claim 1, wherein calculating the silhouette matching degree between the silhouette array and the reference array of the reference image comprises:
   calculating the silhouette matching degree based on each reference array element of the reference array and a corresponding silhouette array element of the silhouette array.

7. A computer device, comprising:
   one or more processors; and
   a memory storing one or more programs configured to be executed by the one or more processors, the one or more programs comprising instructions for:
      obtaining an original image and obtaining a to-be-processed image based on the original image;
      recognizing the to-be-processed image through an image recognition model to obtain a silhouette array, wherein the silhouette array comprises a plurality of silhouette array elements, and the plurality of silhouette array elements comprise a plurality of first values corresponding to a region of interest of the to-be-processed image and a plurality of second values corresponding to a region of non-interest of the to-be-processed image;
      generating a silhouette image based on the silhouette array;
      generating a target image based on the original image and the silhouette image, wherein the target image corresponds to a region of interest of the original image;
      calculating a silhouette matching degree between the silhouette array and a reference array of a reference image; and
      inserting the target image into the reference image if the silhouette matching degree between the silhouette array and the reference array of the reference image is greater than a preset threshold.

8. The computer device according to claim 7, wherein obtaining the original image and obtaining the to-be-processed image based on the original image comprises:
   determining whether a size of the original image is equal to a predetermined size;
   determining the original image as the to-be-processed image if a size of the original image is equal to the predetermined size; and
   adjusting the original image to be the to-be-processed image if the size of the original image is not equal to the predetermined size, wherein a size of the to-be-processed image is equal to the predetermined size.

9. The computer device according to claim 7, wherein the image recognition model comprises a trained neural network model; recognizing the to-be-processed image through the image recognition model to obtain the silhouette array comprises:
   inputting the to-be-processed image into the trained neural network model, and outputting the silhouette array through the neural network model,
   wherein each first value of the silhouette array is in a one-to-one correspondence with each image pixel in the region of interest of the to-be-processed image, and each second value of the silhouette array is in a one-to-one correspondence with each image pixel in the region of non-interest of the to-be-processed image.

10. The computer device according to claim 7, wherein generating the silhouette image based on the silhouette array comprises:
    generating an initial silhouette image based on the silhouette array, wherein the initial silhouette image comprises a plurality of first pixels and a plurality of second pixels, each first pixel in the initial silhouette image is in a one-to-one correspondence with each first value of the silhouette array, and each second pixel in the initial silhouette image is in a one-to-one correspondence with each second value of the silhouette array; and
    generating the silhouette image based on the initial silhouette image, wherein a size of the silhouette image is the same as a size of the original image.

11. The computer device according to claim 10, wherein generating the target image based on the original image and the silhouette image comprises:
    determining the silhouette image as a mask image for a mask filter; and
    extracting the region of interest of the original image from the original image through the mask filter to obtain the target image.

12. The computer device according to claim 7, wherein calculating the silhouette matching degree between the silhouette array and the reference array of the reference image comprises:

calculating the silhouette matching degree based on each reference array element of the reference array and a corresponding silhouette array element of the silhouette array.

13. A non-transitory computer-readable storage medium storing one or more programs comprising instructions that, when executed by one or more processors of a computing device, cause the computing device to perform operations comprising:

obtaining an original image and obtaining a to-be-processed image based on the original image;

recognizing the to-be-processed image through an image recognition model to obtain a silhouette array, wherein the silhouette array comprises a plurality of silhouette array elements, and the plurality of silhouette array elements comprise a plurality of first values corresponding to a region of interest of the to-be-processed image and a plurality of second values corresponding to a region of non-interest of the to-be-processed image;

generating a silhouette image based on the silhouette array;

generating a target image based on the original image and the silhouette image, wherein the target image corresponds to a region of interest of the original image;

calculating a silhouette matching degree between the silhouette array and a reference array of a reference image; and inserting the target image into the reference image if the silhouette matching degree between the silhouette array and the reference array of the reference image is greater than a preset threshold.

14. The non-transitory computer-readable storage medium according to claim 13, wherein obtaining the original image and obtaining the to-be-processed image based on the original image comprises:

determining whether a size of the original image is equal to a predetermined size;

determining the original image as the to-be-processed image if a size of the original image is equal to the predetermined size; and adjusting the original image to be the to-be-processed image if the size of the original image is not equal to the predetermined size, wherein a size of the to-be-processed image is equal to the predetermined size.

15. The non-transitory computer-readable storage medium according to claim 13, wherein the image recognition model comprises a trained neural network model; recognizing the to-be-processed image through the image recognition model to obtain the silhouette array comprises:

inputting the to-be-processed image into the trained neural network model, and outputting the silhouette array through the neural network model, wherein each first value of the silhouette array is in a one-to-one correspondence with each image pixel in the region of interest of the to-be-processed image, and each second value of the silhouette array is in a one-to-one correspondence with each image pixel in the region of non-interest of the to-be-processed image.

16. The non-transitory computer-readable storage medium according to claim 13, wherein generating the silhouette image based on the silhouette array comprises:

generating an initial silhouette image based on the silhouette array, wherein the initial silhouette image comprises a plurality of first pixels and a plurality of second pixels, each first pixel in the initial silhouette image is in a one-to-one correspondence with each first value of the silhouette array, and each second pixel in the initial silhouette image is in a one-to-one correspondence with each second value of the silhouette array; and generating the silhouette image based on the initial silhouette image, wherein a size of the silhouette image is the same as a size of the original image.

17. The non-transitory computer-readable storage medium according to claim 16, wherein generating the target image based on the original image and the silhouette image comprises:

determining the silhouette image as a mask image for a mask filter; and extracting the region of interest of the original image from the original image through the mask filter to obtain the target image.

\* \* \* \* \*